No. 649,622. Patented May 15, 1900.
W. UTING.
ADVERTISING WAGON.
(Application filed Nov. 27, 1899.)
(No Model.) 4 Sheets—Sheet 1.
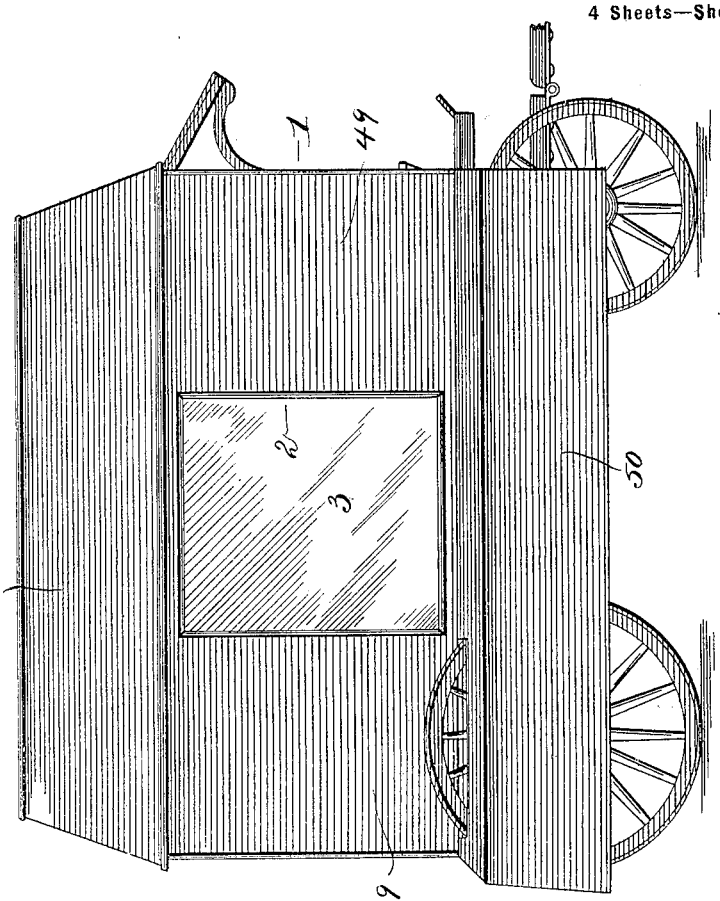
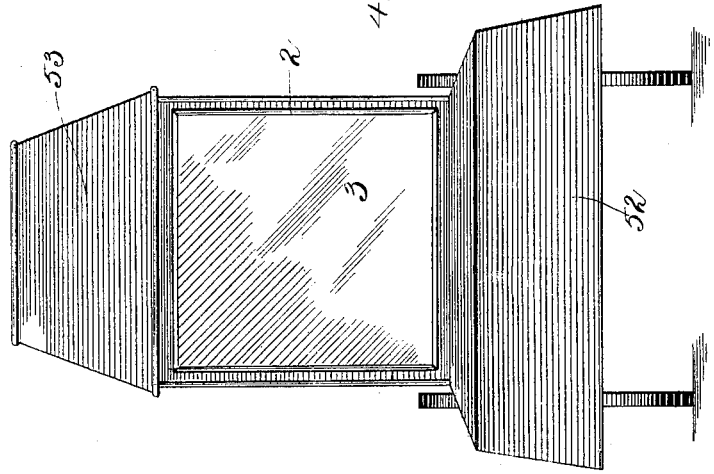
Witnesses.
W. R. Evans
E. Chilcote
Inventor.
William Uting
By William Webster
Attorney.

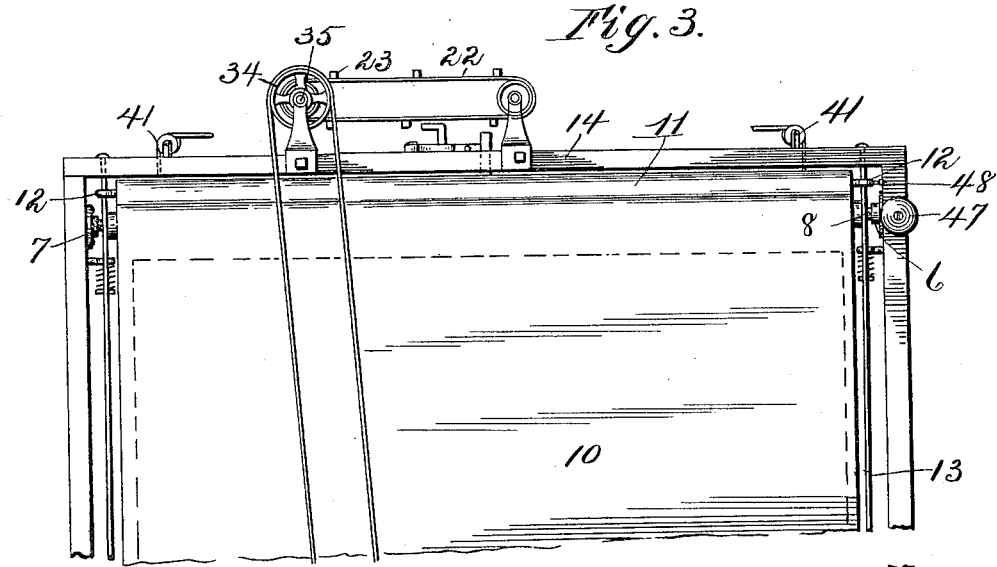
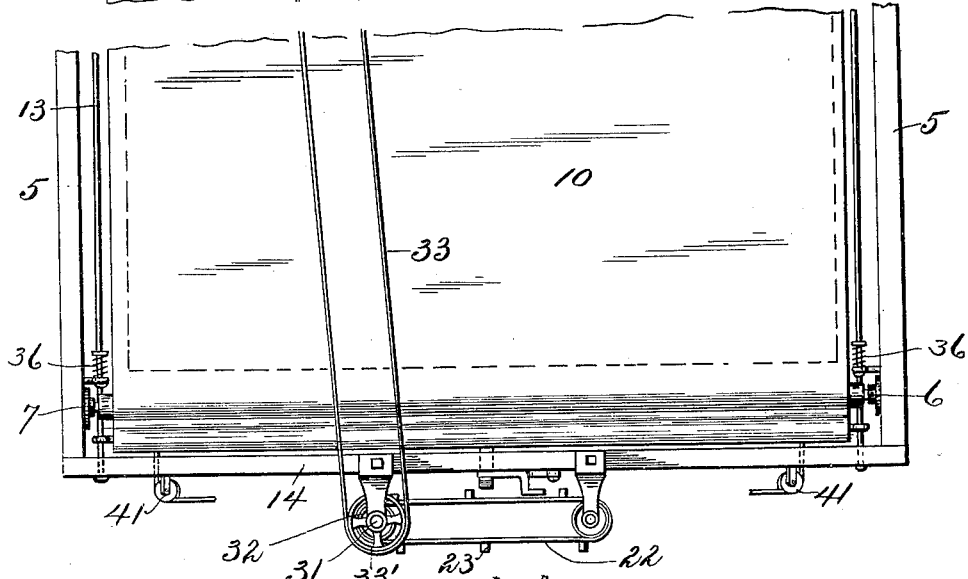

No. 649,622. Patented May 15, 1900.
W. UTING.
ADVERTISING WAGON.
(Application filed Nov. 27, 1899.)
(No Model.) 4 Sheets—Sheet 3.
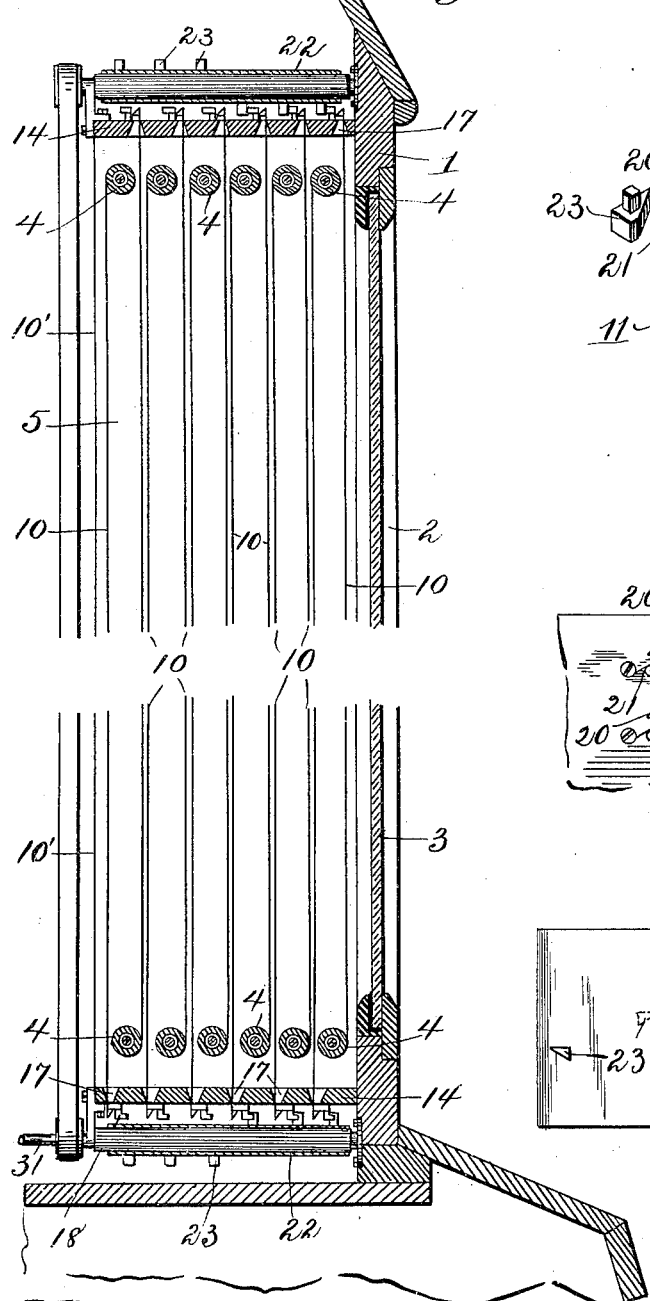
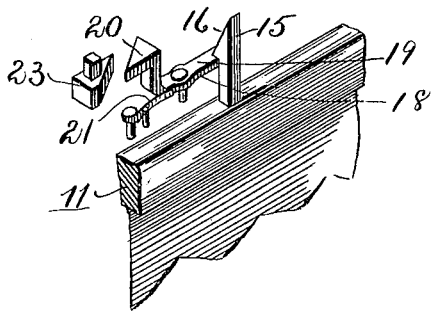
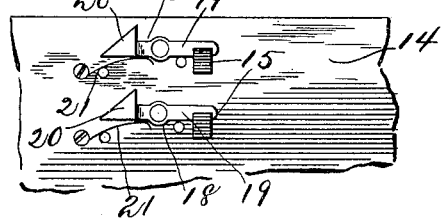
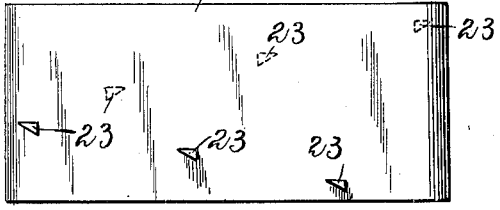
Witnesses.
W. R. Evans
E. Chilcote
Inventor.
William Uting
By. William Webster
Attorney.

No. 649,622. Patented May 15, 1900.
W. UTING.
ADVERTISING WAGON.
(Application filed Nov. 27, 1899.)
(No Model.) 4 Sheets—Sheet 4.
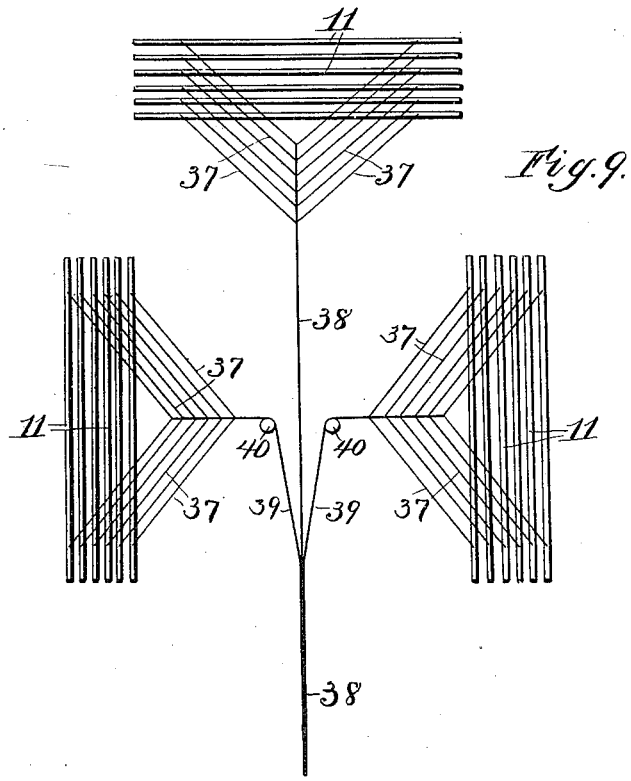
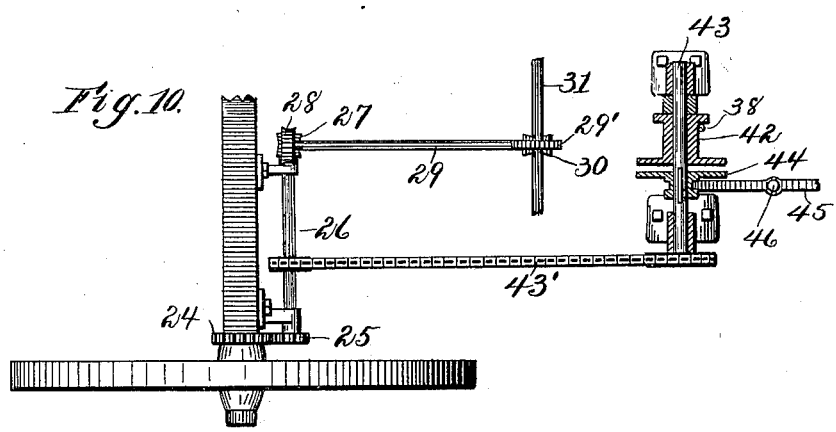
Witnesses.
W. R. Evans
E. Chilcote
Inventor.
William Uting
By William Webster
Attorney.

UNITED STATES PATENT OFFICE.

WILLIAM UTING, OF PHILADELPHIA, PENNSYLVANIA.

ADVERTISING-WAGON.

SPECIFICATION forming part of Letters Patent No. 649,622, dated May 15, 1900.

Application filed November 27, 1899. Serial No. 738,268. (No model.)

*To all whom it may concern:*

Be it known that I, WILLIAM UTING, a citizen of the United States, residing at Philadelphia, county of Philadelphia, and State of Pennsylvania, have invented an Improvement in Advertising-Wagons, of which the following description, in connection with the accompanying drawings, is a specification.

My invention relates to an advertising-wagon, and has for its object to provide for the display of a plurality of advertising-curtains as the wagon is propelled along the street, with means for automatically and successively releasing the displayed curtains to allow them to wind upon their rollers in order to display another curtain or plurality of curtains, the automatic release of the several curtains to be at regular intervals. I have also provided convenient means for automatically unwinding the several curtains from their rollers, with automatic means for holding the curtains in display until automatically released. I have also devised means for economizing the space, whereby a maximum number of rollers may be journaled in a minimum space within the wagon-inclosure.

The invention consists in the parts and combination of parts herein described, and pointed out in the claims.

In the drawings, Figure 1 is a side elevation. Fig. 2 is an end elevation showing the advertising-space in the rear end of the wagon. Fig. 3 is an enlarged view showing the inclosed advertising-space with curtains extended therein, with automatic means for successively releasing the curtains from their fastenings. Fig. 4 is a detailed sectional view showing the fastening for the spring ends of the rollers and also the guide-rods and buffers for the curtains. Fig. 5 is a vertical sectional view of the housing for the curtains. Fig. 6 is a detail perspective view showing the catch for the curtain and means for automatically releasing the same. Fig. 7 is a detail view in plan, showing a sufficient number of catches to illustrate their arrangement. Fig. 8 is a plan view of the belt, showing the arrangement of the trips for successively releasing the curtains. Fig. 9 is a diagrammatic view showing the means employed for extending the curtains. Fig. 10 is a detail view of a preferred means of actuating the tripping mechanism.

In carrying out my invention I construct a boxing 1, preferably rectangular in order to have three display sides, and mount the boxing upon a running-gear. Upon each side and at the rear end are provided open spaces 2 in the framework of the boxing, which are covered by glass panes 3, properly embedded to withstand the jar and strain incident to traveling over rough streets.

4 designates a plurality of spring-rollers journaled in vertical standards 5, secured at the front and rear side, respectively, of the openings 2 and extending within the boxing, each standard in the present instance being of sufficient width to journal six rollers at the top and a like number at the bottom. The rollers are secured in plates 6 7, secured upon the standards, the plates 6 serving as bearings in which the rounded ends 8 upon one end of the roller may revolve, and the plates 7 having rectangular opening 9, in which the squared end of the roller may be secured in order to properly wind the spring of the roller as the curtain 10, secured to the roller, is unwound. Upon each roller there is secured a flexible curtain or chart 10, upon which advertising matter may be displayed, and in operation the curtains or charts journaled in the top of the standards are synchronously pulled down and automatically secured, those journaled in the bottom of the standards being synchronously pulled up and automatically secured. Each curtain or chart is provided with a strip of wood 11 at the free end, into the ends of which are secured screw-eyes 12, through which is passed a guide wire or rod 13, said guides being secured in a top and bottom board 14, respectively, upon the upper and lower ends, respectively, of the standards 5, the standards and cross-boards forming a rectangular framework, within which the curtains or charts are housed marginally, the glass panes 3 housing them upon the front side and a fixed curtain 10' upon the rear side.

Centrally of the length and upon the free edge of the strips 11 is secured a catch 15, having an inclined face 16 to assist in guiding the catch through inclined slots 17, formed in boards 14, the catches being of a length to pass through the board and engage with one end of a dog 18, pivotally secured upon the upper and lower boards 14, respectively. Dogs 18 are pivoted centrally of these lengths and are formed with a plain end 19 to engage catch 15, the opposite end having an inclined face 20, there being a spring 21 bearing against the side of the dog on the side opposite the incline to normally force the end 19 in a position to engage with catch 15. The several dogs 18 are successively moved out of engagement with catches 15 to successively release the curtains or charts by means of traveling belts 22, upon which are secured angular projections 23 in staggered order, so that there is a projection 23 for each dog 18, and arranged to engage in its movement with the inclined face 20 and swing the dog upon its pivot to release the end 19 from engagement with catches 15 of the curtain or chart when by the force of the spring-roller the curtain or chart is rolled upon the same. The projections 23 are arranged upon belts 22 in such order that they alternate in releasing the catches of the curtains successively—that is to say, all of the curtains being extended the front curtain or chart, bearing the advertisements of a certain firm, is tripped and is automatically wound upon its roller, thereby disclosing the next or second curtain or chart. The arrangement just described is the same upon each side and also the rear end. The six belts 22 are preferably arranged to cause a synchronous release of the curtains or charts of each side and the end. Belts 22 are preferably driven by power derived from one of the wheels of the wagon. As shown, there is a gear-wheel 24, secured upon the hub of the wheel, into which meshes a gear 25 upon a shaft 26, upon which is a worm 27, which meshes with worm-wheel 28 upon a countershaft 29, upon which is a worm 30, which gears with a worm-wheel 29' upon shaft 31, shaft 31 having a pulley 32 connected therewith, over which the endless belt 22 runs, there being a belt 33 upon pulley 33', which drives pulley 34 upon shaft 35 to drive the endless belt 22 at the top of the frame. It will be seen that by this arrangement I have provided for an intermittent or successive release of the curtains or charts, and therefore the alternate display of the different advertisements.

As the several curtains or charts are released they are rolled up quickly by the spring-rollers, and to prevent fracture of the curtains I provide spring-buffers 36 upon guides 13, against which the screw-eyes 12 abut, thereby preventing too sudden strain upon the curtain. When the last curtain has been released and rolled, they are again extended simultaneously by mechanical means, as follows: To the free end of each curtain there is attached a rope 37 of a length to be secured at each end near the outer ends of strip 11, and to the center of rope 37 is attached a pull-rope 38. In order to raise the six curtains of each side and the six end curtains simultaneously, the several ropes 37 of each series of six curtains are of sufficient length to diverge from their several points of attachment with the curtains and be attached to pull-rope 38, the ropes 37 of the side curtains by means of branch ropes 39, which pass over idlers 40, there being a like attachment with the curtains to be pulled down, the pull-rope of the lower series being joined to the pull-rope 38. Immediately over at the top of the frame and coincidently at the bottom with the ropes 37 are idlers 41, Fig. 3, over which the ropes 37 run to cause the said ropes to exert a straight pull upon the curtains. Pull-rope 38 is attached to a drum 42, loosely journaled upon a shaft 43, said shaft being geared with shaft 26 by means of a sprocket-chain 43, running over sprocket-wheels upon shafts 26 and 43, respectively. Drum 42 is caused to revolve by means of a friction-plate 44, splined upon shaft 43 and controlled by the driver of the wagon by means of a lever 45, which is fulcrumed at 46 with the free end extended within convenient reach of the driver.

In order to notify the driver when the last curtain is extended, I arrange a bell 47 in the path of travel of a projection 48 upon the last curtain to be extended, this bell also striking the alarm as the last curtain starts to roll upon its roller. By this means the driver or operator is informed when the last curtain starts to roll and also when all of the curtains are extended. In the latter instance he immediately releases the friction-plate from contact with the drum. Should he neglect to release the friction, however, the contact of strip 11 with the frame will overcome the friction and the drum will be held stationary until the friction is released. Upon each side of the advertising-space described with relation to the sides there is an additional stationary space 49, upon which advertisements are placed, and below these spaces I extend side boards 50 for the same purpose, and by slanting the top sides 51 I provide additional advertising-space, the rear end being also provided with a depending board 52 and inclined top portion 53 for the same purpose.

It will be understood from the foregoing that I have provided for a novel and attractive means of intermittently displaying a plurality of advertising-curtains, with means for quickly raising and lowering the same to repeat the operation. The fact of the particular advertising-curtain remaining in a fixed position a sufficient period of time to be read and then instantly disappearing to disclose another advertising-curtain is a feature that lends great value in the art of advertising by creating curiosity and a desire to watch for the next succeeding advertisement.

While I have shown and described a preferred means for automatically releasing the curtains and also a practical means for extending the curtains, I wish it understood that I may vary the construction greatly without departing from the spirit of my invention.

What I claim is—

1. In an advertising-wagon, a plurality of spring-actuated advertising-curtains, catches upon the curtains, dogs in the path of travel of the catches, adapted to engage the same when the curtain is extended and means for releasing the catches.

2. In an advertising-wagon a plurality of spring-actuated advertising-curtains, catches upon the curtains, dogs in the path of travel of the catches, adapted to engage the same when the curtains are extended, and means for mechanically extending the curtains simultaneously and automatic means for successively releasing the curtains.

3. In an advertising-wagon, a plurality of normally-rolled vertically-extensible advertising-curtains, means for extending the curtains, fastenings for holding the curtains extended and movable belts having projections adapted to trip the fastenings to release the curtains successively.

4. In an advertising-wagon a plurality of advertising-curtains normally rolled in alternate inverse order, means for extending the curtains in their alternate order, and means for alternately and successively releasing the curtains.

5. In an advertising-wagon, housings formed in the sides and rear end respectively of the wagon, a plurality of spring-actuated curtains in each housing, each of the curtains having a rope secured at its free end, a pull-rope, connections with each of the ropes upon the curtains and the pull-rope, whereby when the pull-rope is actuated, the several curtains upon the sides and end respectively are extended simultaneously, and means for actuating the pull-rope.

6. In an advertising-wagon, housings formed in the sides and rear end respectively of the wagon, a plurality of spring-actuated curtains in each housing, a number of the curtains journaled in the top of each casing to be extended downwardly, and a number of the curtains journaled at the bottom of the casing to be extended upwardly each of the curtains having a rope secured at its free end, a pull-rope, connections with each of the ropes upon the curtains and the pull-rope, whereby when the pull-rope is actuated, the several curtains are extended simultaneously, and means for actuating the pull-rope.

In testimony whereof I have subscribed my hand this 23d day of November, 1899.

WILLIAM UTING.

Witnesses:
WILLIAM WEBSTER,
JAMES HOBSON.